United States Patent
Bunting

(10) Patent No.: US 11,231,275 B2
(45) Date of Patent: Jan. 25, 2022

(54) LENGTH SELECTABLE SPIRIT LEVEL AND MEASUREMENT DEVICE

(71) Applicant: Stewart Bunting, Elizabethton, TN (US)

(72) Inventor: Stewart Bunting, Elizabethton, TN (US)

( * ) Notice: Subject to any disclaimer, the term of this patent is extended or adjusted under 35 U.S.C. 154(b) by 71 days.

(21) Appl. No.: 16/781,406

(22) Filed: Feb. 4, 2020

(65) Prior Publication Data

US 2021/0239468 A1    Aug. 5, 2021

(51) Int. Cl.
| | | |
|---|---|---|
| G01C 9/34 | (2006.01) | |
| G01B 3/00 | (2006.01) | |
| G01B 3/08 | (2006.01) | |

(52) U.S. Cl.
CPC ............... *G01C 9/34* (2013.01); *G01B 3/004* (2013.01); *G01B 3/08* (2013.01)

(58) Field of Classification Search
USPC .......................................................... 33/451
See application file for complete search history.

(56) References Cited

U.S. PATENT DOCUMENTS

| | | | | |
|---|---|---|---|---|
| 733,570 | A * | 7/1903 | Victor ...................... | G01C 9/28 33/451 |
| 2,230,010 | A * | 1/1941 | Owens ..................... | G01B 3/02 33/489 |
| 2,551,524 | A * | 5/1951 | Bullivant ................. | G01C 9/28 33/374 |
| 2,635,351 | A * | 4/1953 | Marcinkowski ......... | G01C 9/26 33/376 |
| 3,104,477 | A * | 9/1963 | Edwill ..................... | G01C 9/28 33/374 |
| 3,183,602 | A * | 5/1965 | Updyke .................... | G01C 9/34 33/376 |
| 4,152,838 | A   | 5/1979 | Cook | |
| 4,928,395 | A * | 5/1990 | Good ........................ | G01C 9/24 33/374 |
| 5,412,875 | A * | 5/1995 | Hilderbrandt ............ | G01C 9/28 33/374 |
| 5,915,810 | A   | 6/1999 | Cameron | |
| 6,041,510 | A   | 3/2000 | Huff | |
| 6,047,478 | A * | 4/2000 | Sowers ..................... | G01C 9/26 33/374 |

(Continued)

FOREIGN PATENT DOCUMENTS

GB         2278918 A  * 12/1994   ............... G01C 9/28

*Primary Examiner* — Christopher W Fulton

(57) ABSTRACT

A length selectable spirit level and measurement device for simultaneous measurement and leveling includes a first bar and a second bar. The first bar has a channel positioned therethrough, which extends between opposed ends thereof. A pair of slats positioned in the channel is slidably engaged to the first bar and thus selectively extensible therefrom. Respective indicia of a plurality of indicia coupled to the slats are alignable with a pair of points to measures a distance between the points. The second bar has a set of orifices positioned therethrough, each of which has a spirit bubble tube positioned therein and coupled to the second bar. The spirit bubble tube indicates an orientation of a longitudinal axis of the second bar relative to horizontal. The first bar is selectively engageable to the second bar so that the slats are selectively extensible in parallel with the longitudinal axis.

9 Claims, 4 Drawing Sheets

(56) References Cited

U.S. PATENT DOCUMENTS

| | | | |
|---|---|---|---|
| 6,293,023 B1 | 9/2001 | Schooley | |
| 6,637,120 B2 | 10/2003 | Pustay | |
| 7,281,335 B2 * | 10/2007 | Feliciano | G01C 9/26 33/374 |
| 7,497,022 B1 | 3/2009 | Aarhus | |
| D625,631 S | 10/2010 | Ben-Josef | |
| 10,690,471 B1 * | 6/2020 | DuFaux | G01B 3/002 |
| 2003/0079357 A1 * | 5/2003 | Liao | G01C 9/28 33/374 |
| 2020/0132455 A1 * | 4/2020 | Sanders | G01C 9/34 |

\* cited by examiner

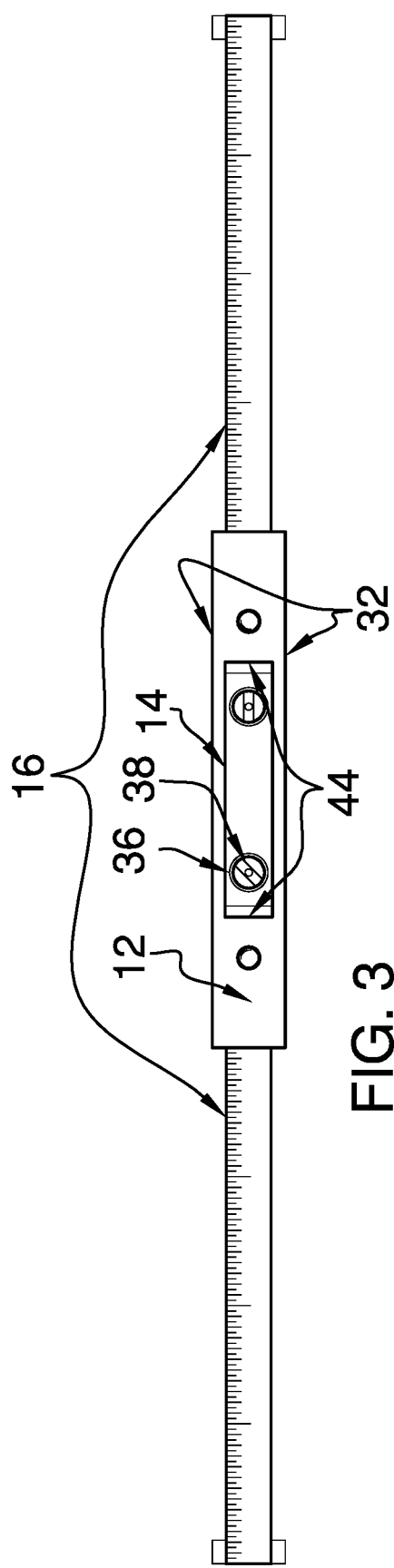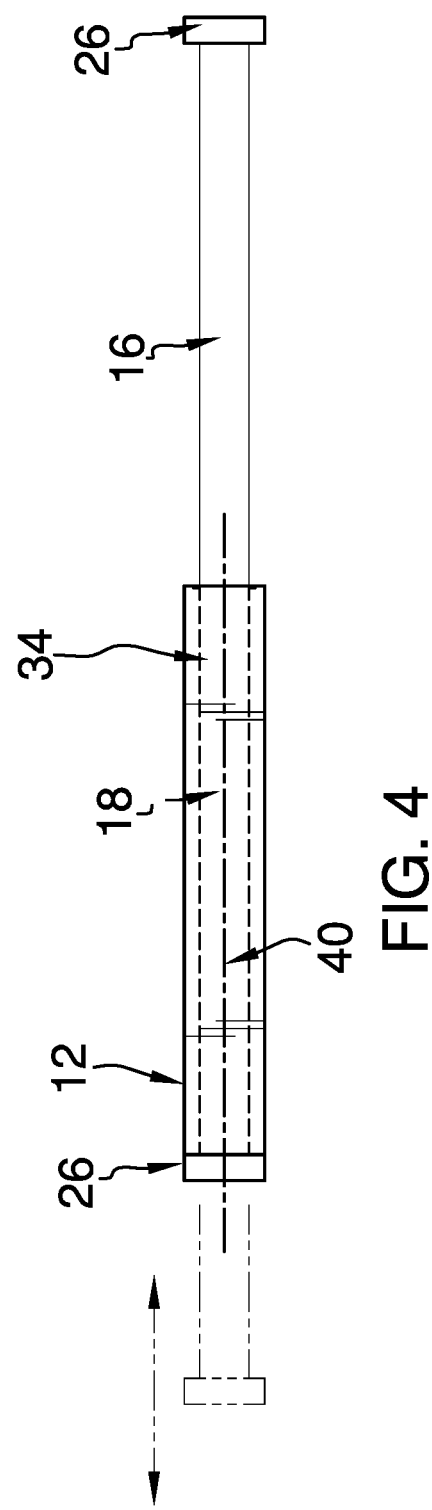

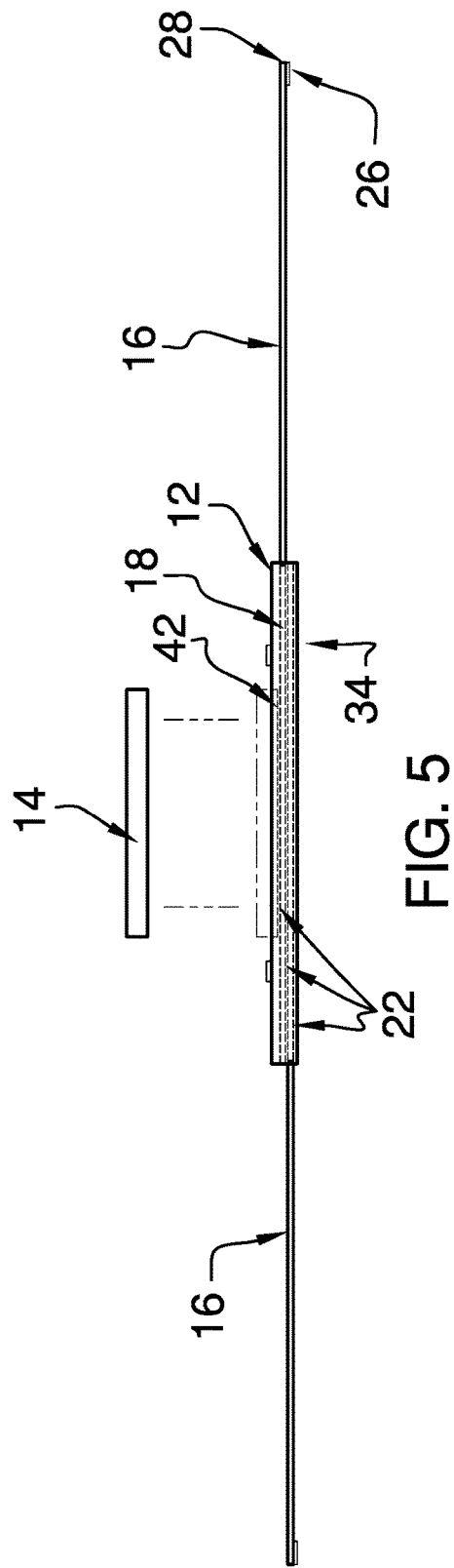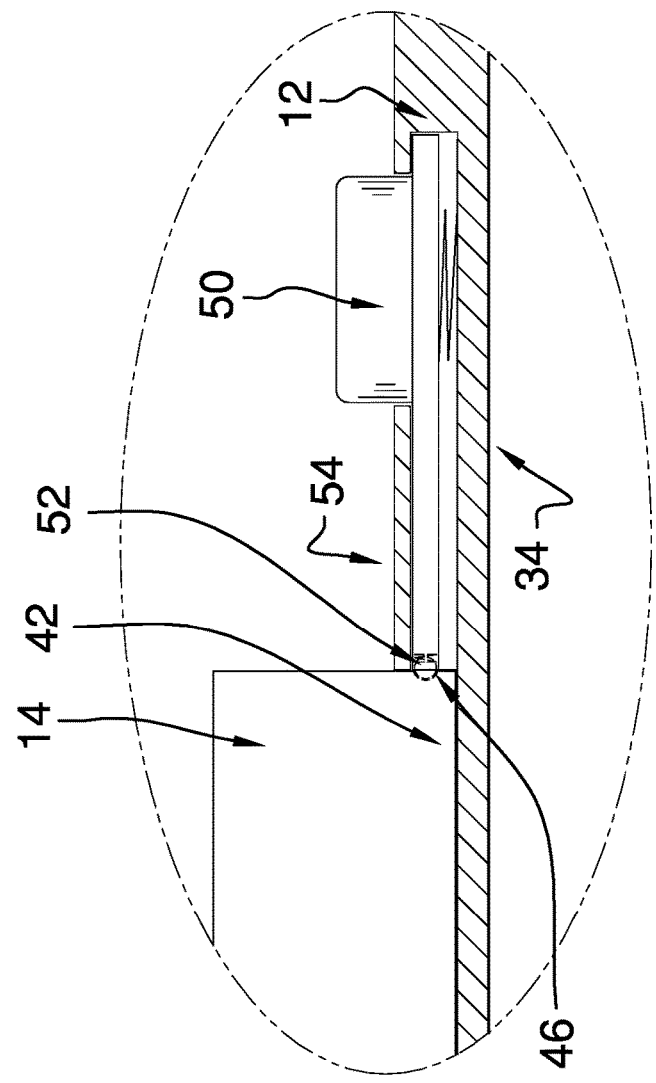

LENGTH SELECTABLE SPIRIT LEVEL AND MEASUREMENT DEVICE

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to spirit level devices and more particularly pertains to a new spirit level device for simultaneous measurement and leveling.

(2) Description of Related Art Including Information Disclosed Under 37 CFR 1.97 and 1.98

The prior art relates to spirit level devices, and more particularly to spirit level devices that are length adjustable. Prior art variable length spirit level devices may comprise a first element that is selectively extensible from a second element.

BRIEF SUMMARY OF THE INVENTION

An embodiment of the disclosure meets the needs presented above by generally comprising a first bar and a second bar. The first bar has a channel positioned therethrough, which extends between opposed ends thereof. A pair of slats is slidably engaged to the first bar and is positioned in the channel. Each slat is selectively extensible from an associated opposed end of the first bar. A plurality of indicia is coupled to the slats. Respective indicia are configured to be aligned with a pair of points to measure a distance between the points.

The second bar has a set of orifices positioned therethrough. Each orifice has a spirit bubble tube positioned therein and coupled to the second bar. The spirit bubble tube is configured to indicate an orientation of a longitudinal axis of the second bar relative to horizontal. The first bar is selectively engageable to the second bar so that the slats are selectively extensible in parallel with the longitudinal axis. A user is positioned to utilize the second bar to assess level over shorter distances, the second bar engaged to the first bar to assess level over longer distances, and then to extend one or both of the slats from the channel to assess level over still longer distances.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein:

FIG. 3 is a top view of an embodiment of the disclosure.

FIG. 4 is a bottom view of an embodiment of the disclosure.

FIG. 5 is a side view of an embodiment of the disclosure.

FIG. 6 is a detail view of an embodiment of the disclosure.

DETAILED DESCRIPTION OF THE INVENTION

Figure 1:
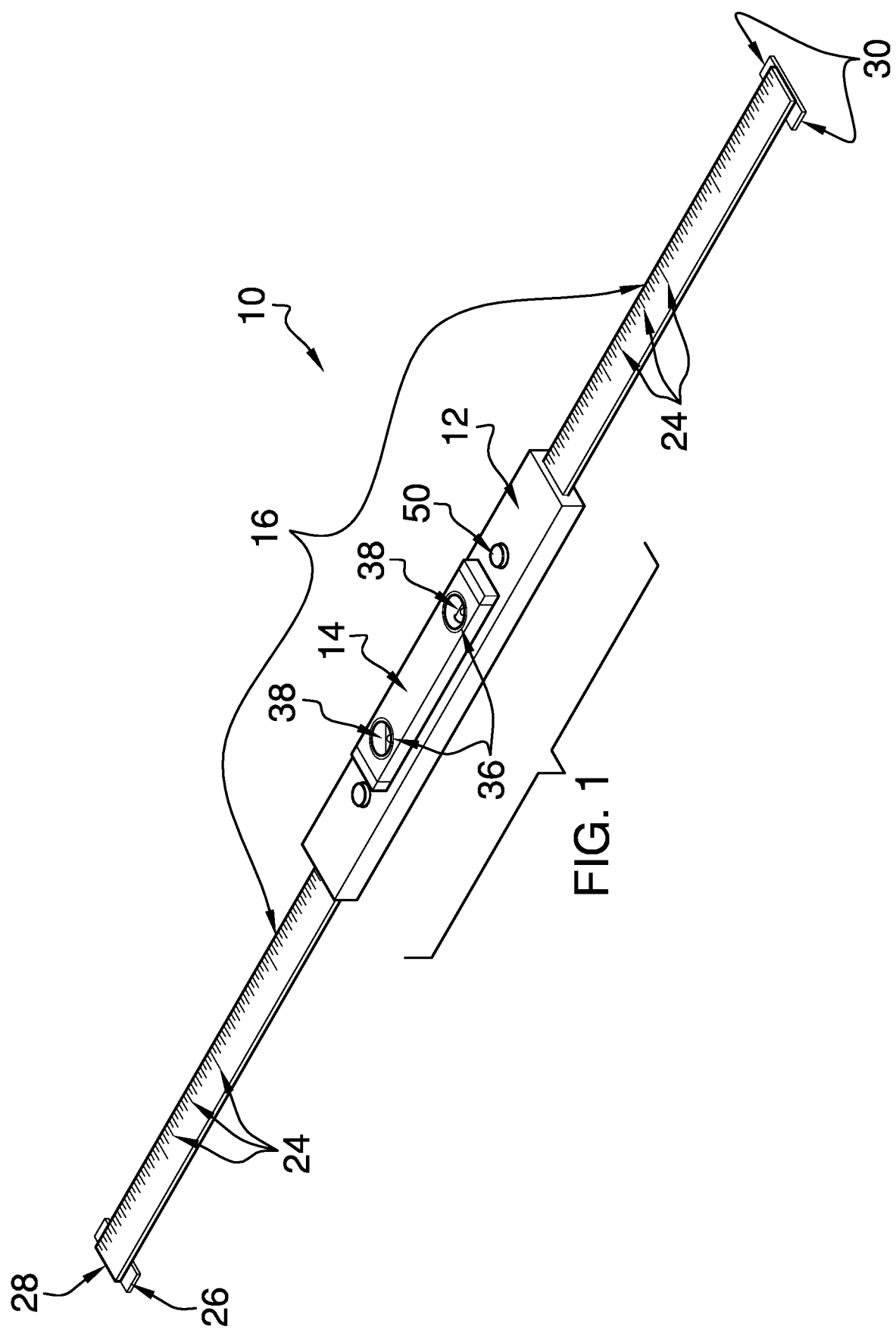
FIG. 1 is an isometric perspective view of a length selectable spirit level and measurement device according to an embodiment of the disclosure.

With reference now to the drawings, and in particular to FIGS. 1 through 6 thereof, a new spirit level device embodying the principles and concepts of an embodiment of the disclosure and generally designated by the reference numeral 10 will be described.

As best illustrated in FIGS. 1 through 6, the length selectable spirit level and measurement device 10 generally comprises a first bar 12, a second bar 14, and a pair of slats 16. The first bar 12 has a channel 18 positioned therethrough, which extends between opposed ends 20 thereof. The slats 16 are slidably engaged to the first bar 12 and are positioned in the channel 18. Each slat 16 is selectively extensible from an associated opposed end 20 of the first bar 12. A set of tracks 22 is coupled to the first bar 12 and is positioned in the channel 18. The tracks 22 are positioned to guide extension and retraction of the slats 16.

A plurality of indicia 24 is coupled to the slats 16, as shown in FIG. 3. Respective indicia 24 are configured to be aligned with a pair of points to measure a distance between the points.

Figure 2:
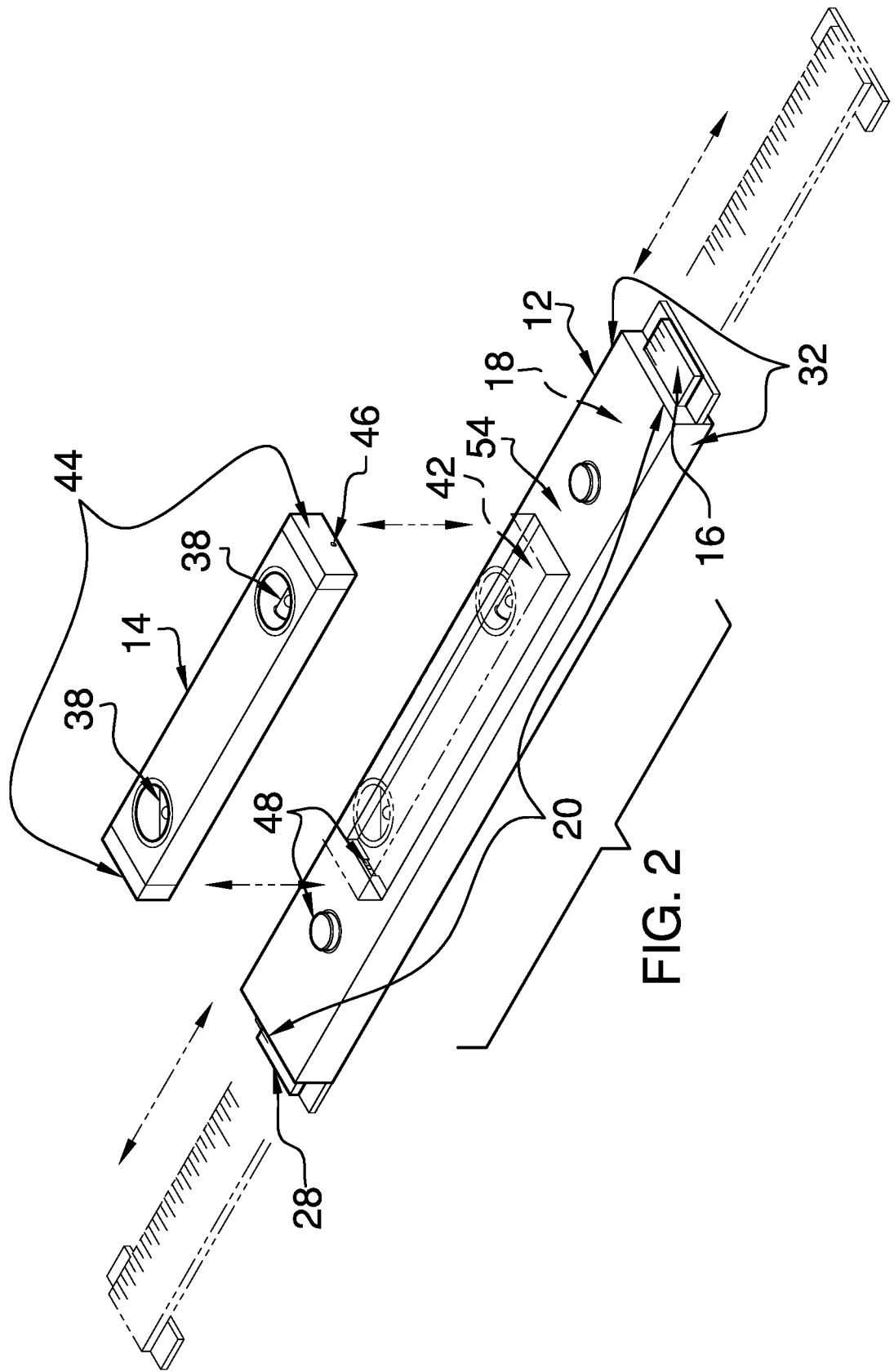
FIG. 2 is an exploded view of an embodiment of the disclosure.

Each slat 16 has a spacer 26 coupled thereto and extending bilaterally from a terminus 28 thereof, distal from the first bar 12. The spacer 26 has opposed endpoints 30, each of which is coplanar with a respective opposed side 32 of the first bar 12, as shown in FIG. 2. The spacer 26 may comprise rubber, or other semirigid material, such as, but not limited to, silicone, elastomer, and the like. The spacer 26 assists in measuring and leveling with the device 10 by frictionally coupling to surfaces, such as a wall, against which a back 34 of the first bar 12 is positioned. Additionally, the spacer 26 functions to stabilize the slat 16 relative to the first bar 12 when a respective opposed side 32 of the first bar 12 is positioned on the surface, as a respective opposed endpoint 30 also is positioned on the surface.

The second bar 14 has a set of orifices 36 positioned therethrough. Each orifice 36 has a spirit bubble tube 38 positioned therein and coupled to the second bar 14. The spirit bubble tube 38 is configured to indicate an orientation of a longitudinal axis 40 of the second bar 14 relative to horizontal, such as parallel to horizontal (level) or perpendicular to horizontal (vertical or plumb).

The first bar 12 is selectively engageable to the second bar 14 so that the slats 16 are selectively extensible in parallel with the longitudinal axis 40. A user thus is positioned to utilize the second bar 14 to assess level over shorter distances. The second bar 14 is engaged to the first bar 12 to assess level over longer distances. One or both slats 16 is extended from the channel 18 to assess level over still longer distances.

The first bar 12 has a recess 42 extending into a front 54 thereof. The recess 42 may be positioned equally distant from the opposed ends 20, as shown in FIG. 2. The second bar 14 is shaped complementarily to the recess 42 so that the second bar 14 is selectively insertable into the recess 42. The second bar 14 has opposing ends 44. Each opposing end 44 has an indentation 46 extending thereinto.

A fastener 48 is engaged to the first bar 12 and is configured to reversibly engage the second bar 14 to removably engage the second bar 14 to the first bar 12. The fastener 48 comprises a button 50, which engaged to the first bar 12. The button 50 is spring loaded and biased to an extended position. A ball 52 is engaged to the button 50 and extends into the recess 42. The ball 52 is complementary to the indentation 46. The ball 52 is spring loaded and is positioned to insert into the indentation 46 to engage the second bar 14 to the first bar 12, as shown in FIG. 6, as the second bar 14 is inserted into the recess 42. With each indentation 46 having a respective ball 52 inserted thereinto, the second bar 14 is fixedly positioned within the recess 42. The button 50 is configured to be depressed to disengage the ball 52 from the indentation 46 so that the second bar 14 is disengaged from the first bar 12. The present invention anticipates the fastener 48 comprising other fastening means, such as, but not limited to, magnetic fasteners, clips, clamps, and the like.

In use, the second bar 14 can be utilized alone to assess level over shorter distances, such as five to 60 centimeters. With the second bar 14 engaged to the first bar 12, the user is positioned to assess level over longer distances, such as 61 to 120 centimeters. The user then can selectively extend the slats 16 to assess level over even longer distances, such as 121 to 365 centimeters. Concurrently or independently with assessing level, the user is positioned to determine the distance between a pair of points by selectively aligning respective indicia 24 with the points.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the elements is present, unless the context clearly requires that there be only one of the elements.

I claim:

1. A length selectable spirit level and measurement device comprising:
   a first bar having a channel positioned therethrough and extending between opposed ends thereof;
   a pair of slats slidably engaged to the first bar and positioned in the channel such that each slat is selectively extensible from an associated opposed end of the first bar, each slat having a spacer coupled thereto, each spacer extending bilaterally from a terminus of the slat distal from the first bar, the spacer having opposed endpoints, each spacer being elongated between opposed endpoints, each opposed endpoint being coplanar with a respective opposed side of the first bar, each spacer being planar and coupled to the slat in a position parallel to the slat with a longitudinal edge being aligned with the terminus of the slat whereby a portion of the slat corresponding to a width of the spacer is exposed outside the channel when the slat is fully inserted into the channel;
   a plurality of indicia coupled to the slats wherein respective indicia are configured for aligning with a pair of points for measuring a distance between the points; and
   a second bar having a set of orifices positioned therethrough, each orifice having a spirit bubble tube positioned therein and being coupled to the second bar, wherein the spirit bubble tube is configured for indicating an orientation of a longitudinal axis of the second bar relative to horizontal, the first bar being selectively engageable to the second bar such that the slats are selectively extensible in parallel with the longitudinal axis.

2. The length selectable spirit level and measurement device of claim 1, further including a set of tracks coupled to the first bar and positioned in the channel such that the set of tracks is positioned for guiding extension and retraction of the slats.

3. The length selectable spirit level and measurement device of claim 1, wherein the spacer comprises rubber.

4. The length selectable spirit level and measurement device of claim 1, wherein:
   the first bar has a recess extending into a front thereof; and
   the second bar is shaped complementarily to the recess such that the second bar is selectively insertable into the recess.

5. The length selectable spirit level and measurement device of claim 4, wherein the recess is positioned equally distant from the opposed ends of the first bar.

6. The length selectable spirit level and measurement device of claim 4, further including a fastener engaged to the first bar and being configured for reversibly engaging the second bar for removably engaging the second bar to the first bar.

7. The length selectable spirit level and measurement device of claim 6, further including:
- the second bar having opposing ends, each opposing end having an indentation extending thereinto; and
- the fastener comprising:
  - a button engaged to the first bar, the button being spring loaded such that the button is biased to an extended position, and
  - a ball engaged to the button and extending into the recess, the ball being complementary to the indentation, the ball being spring loaded such that the ball is positioned for inserting into the indentation, as the second bar is inserted into the recess, for engaging the second bar to the first bar, wherein the button is configured for depressing for disengaging the ball from the indentation such that the second bar is disengaged from the first bar.

8. The length selectable spirit level and measurement device of claim 1, further including a fastener engaged to the first bar and being configured for reversibly engaging the second bar for removably engaging the second bar to the first bar.

9. A length selectable spirit level and measurement device comprising:
- a first bar having a channel positioned therethrough and extending between opposed ends thereof, the first bar having a recess extending into a front thereof, the recess being positioned equally distant from the opposed ends;
- a pair of slats slidably engaged to the first bar and positioned in the channel such that each slat is selectively extensible from an associated opposed end of the first bar;
- a set of tracks coupled to the first bar and positioned in the channel such that the set of tracks is positioned for guiding extension and retraction of the slats;
- a plurality of indicia coupled to the slats wherein respective indicia are configured for aligning with a pair of points for measuring a distance between the points;
- each slat having a spacer coupled thereto and extending bilaterally from a terminus thereof distal from the first bar, the spacer having opposed endpoints, each spacer being elongated between opposed endpoints, each opposed endpoint being coplanar with a respective opposed side of the first bar, the spacer comprising rubber, each spacer being planar and coupled to the slat in a position parallel to the slat with a longitudinal edge being aligned with the terminus of the slat whereby a portion of the slat corresponding to a width of the spacer is exposed outside the channel when the slat is fully inserted into the channel;
- a second bar having a set of orifices positioned therethrough, each orifice having a spirit bubble tube positioned therein and being coupled to the second bar, wherein the spirit bubble tube is configured for indicating an orientation of a longitudinal axis of the second bar relative to horizontal, the first bar being selectively engageable to the second bar such that the slats are selectively extensible in parallel with the longitudinal axis, the second bar being shaped complementarily to the recess such that the second bar is selectively insertable into the recess, the second bar having opposing ends, each opposing end having an indentation extending thereinto; and
- a fastener engaged to the first bar and being configured for reversibly engaging the second bar for removably engaging the second bar to the first bar, the fastener comprising:
  - a button engaged to the first bar, the button being spring loaded such that the button is biased to an extended position, and
  - a ball engaged to the button and extending into the recess, the ball being complementary to the indentation, the ball being spring loaded such that the ball is positioned for inserting into the indentation, as the second bar is inserted into the recess, for engaging the second bar to the first bar, wherein the button is configured for depressing for disengaging the ball from the indentation such that the second bar is disengaged from the first bar.

* * * * *